(12) United States Patent
Allen

(10) Patent No.: US 8,732,233 B2
(45) Date of Patent: May 20, 2014

(54) INTEGRATING PORTABLE ELECTRONIC DEVICES WITH ELECTRONIC FLIGHT BAG SYSTEMS INSTALLED IN AIRCRAFT

(75) Inventor: David L. Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 1589 days.

(21) Appl. No.: 11/180,202

(22) Filed: Jul. 13, 2005

(65) Prior Publication Data

US 2007/0055416 A1 Mar. 8, 2007

(51) Int. Cl.
G06F 15/16 (2006.01)

(52) U.S. Cl.
USPC ........... 709/203; 709/205; 709/212; 709/232; 709/248; 701/4; 701/14; 701/15; 701/16; 701/29; 701/33

(58) Field of Classification Search
USPC ........ 709/203, 205, 212, 223, 248; 701/4, 14, 701/15, 16, 29, 33, 3, 10, 29.1, 30.1; 340/945, 963, 973
See application file for complete search history.

(56) References Cited

U.S. PATENT DOCUMENTS

| | | | |
|---|---|---|---|
| 4,943,919 A | 7/1990 | Aslin et al. | |
| 5,894,323 A | 4/1999 | Kain et al. | 348/116 |
| 5,974,454 A | 10/1999 | Apfel et al. | |
| 6,064,922 A | 5/2000 | Lee | 701/3 |
| 6,131,120 A * | 10/2000 | Reid | 709/225 |
| 6,173,159 B1 | 1/2001 | Wright et al. | |
| 6,253,129 B1 | 6/2001 | Jenkins et al. | |
| 6,266,736 B1 | 7/2001 | Atkinson et al. | 711/103 |
| 6,597,294 B1 * | 7/2003 | Ariens | 340/995.26 |
| 6,732,176 B1 * | 5/2004 | Stewart et al. | 709/227 |
| 6,816,728 B2 | 11/2004 | Igloi et al. | 455/431 |
| 6,816,762 B2 * | 11/2004 | Hensey et al. | 701/35 |
| 6,859,688 B1 | 2/2005 | Orf et al. | 701/3 |
| 6,894,611 B2 | 5/2005 | Butz et al. | 340/539.1 |
| 7,020,708 B2 | 3/2006 | Nelson et al. | 709/230 |
| 7,149,612 B2 * | 12/2006 | Stefani et al. | 701/35 |

(Continued)

FOREIGN PATENT DOCUMENTS

| | | |
|---|---|---|
| GB | 2 404 126 A | 1/2005 |
| WO | WO 99/45465 | 9/1999 |
| WO | WO 02/079918 | 10/2002 |
| WO | WO 2005/031545 | 4/2005 |

OTHER PUBLICATIONS

Cellular Networking Perspectives, 2002, © Feb. 21, 2004: Cellular Networking Perspectives Ltd., http://www.cnp-wireless.com/ArticleArchive/Wireless20Telecom/2002Q3-SMSIntrworking.htm.

(Continued)

*Primary Examiner* — Michael Y Won
(74) *Attorney, Agent, or Firm* — Harness, Dickey & Pierce, P.L.C.

(57) ABSTRACT

An electronic flight bag apparatus includes an electronic flight bag (EFB) system installed in an aircraft and which interfaces with a ground network, and a portable EFB device connectible with the EFB system via a trusted secure connection. This apparatus makes it possible for a flight crew member to remove the portable device from the aircraft, enter flight information into the device in a convenient manner, and transfer the information to the installed EFB system. Auxiliary crew members may use the portable device during flight to assist the flight crew.

19 Claims, 3 Drawing Sheets

(56) References Cited

U.S. PATENT DOCUMENTS

| | | | | |
|---|---|---|---|---|
| 7,188,085 | B2* | 3/2007 | Pelletier | 705/50 |
| 7,612,688 | B1* | 11/2009 | Vigeant-Langlois et al. | 340/971 |
| 7,788,002 | B2* | 8/2010 | Yukawa et al. | 701/31.4 |
| 7,876,238 | B2* | 1/2011 | Vandenbergh et al. | 340/971 |
| 7,908,042 | B2* | 3/2011 | Brinkley et al. | 701/3 |
| 2003/0003872 | A1 | 1/2003 | Brinkley et al. | 455/66 |
| 2003/0061435 | A1 | 3/2003 | Ferguson et al. | 711/103 |
| 2004/0056766 | A1 | 3/2004 | Butz et al. | 340/539.1 |
| 2005/0021969 | A1* | 1/2005 | Williams et al. | 713/176 |
| 2005/0026608 | A1 | 2/2005 | Kallio et al. | 455/431 |
| 2005/0148327 | A1 | 7/2005 | Perez et al. | |
| 2005/0288831 | A1* | 12/2005 | Lusardi et al. | 701/3 |
| 2006/0047381 | A1 | 3/2006 | Anguyen | 701/29 |
| 2006/0091257 | A1* | 5/2006 | Melberg et al. | 244/118.5 |
| 2007/0024422 | A1* | 2/2007 | Doyen | 340/5.81 |
| 2007/0055416 | A1* | 3/2007 | Allen | 701/3 |

OTHER PUBLICATIONS

Wireless Messaging Suite, Mobile Messaging Platform, undated but effective as of Jul. 7, 2005; http://www.hssworld.com/commapps/smsc/faq.htm.

Flextronics Software Systems, FAQs; undated—web site last updated May 3, 2004 and effective as of Jul. 7, 2005; http://www.hssworld.com/commapps/smsc/faq.htm.

Core—Free FTP client software—Core FTP LE; Web site © 2003 Cre FTP; site effective as of Jul. 7, 2005; http://www.coreftp.com.

Tucows, PC Police Professional version 1.0.1, version date May 3, 2005; article undated but effective Jul. 7, 2005; web site © 2005 Tucows Inc.; http://www.tucows.com/preview/342212.

Download Managers—Free Software; undated—Links active as of Sep. 4, 2004; effective Jul. 7, 2005; site © 1997-2004 Alan Sawicki http://freeware.intrastar.net/downloads.htm.

Microsoft Office Online, About e-mail security; undated; Web site © 2005 Microsoft Corporation; effective Jul. 7, 2005; http://office.microsoft.com/en-us/assistance/HP030834341033.aspx.

Article by David Allen entitled "EFB—Electronic Flight Bag"; Aero, Third Quarter, Jul. 2003; pp. 16-27.

Subject: Guidelines for the Certification, Airworthiness, and Operational Approval of Electronic Flight Bag Computing Devices by Nicholas A. Sabatini; U.S. Department of Transportation Federal Aviation Administration Advisory Circular; Mar. 17, 2003; 32 pages.

EFB brochure—AvVantage Information Solutions—Advanced technologies for aviation; Date unknown (but prior to Jul. 13, 2005).

"A Strong Client-Server Mutual Authentication Scheme"; disclosed by International Business Machines Corporation 41787.

* cited by examiner

INTEGRATING PORTABLE ELECTRONIC DEVICES WITH ELECTRONIC FLIGHT BAG SYSTEMS INSTALLED IN AIRCRAFT

FIELD OF THE INVENTION

The present invention relates to communications systems and particularly (but not exclusively) to a portable electronic flight bag device that can interface with an electronic flight bag system installed in an aircraft.

BACKGROUND OF THE INVENTION

Electronic flight bags (EFBs) are computing/display devices and systems that may be used by airplane cockpit/ flight deck crews for a variety of functions. Using EFBs can reduce or eliminate a need for paper and other reference materials in the cockpit. The Federal Aviation Administration (FAA) currently classifies EFB devices and systems as Class 1, Class 2 or Class 3 hardware systems. A Class 1 EFB is typically a portable laptop computer that may be used on the ground and during flight as a source of supplemental information. A Class 1 device does not have data link connectivity to other aircraft systems and generally is required to be stowed when the aircraft is below an altitude of 10,000 feet. A Class 2 EFB typically is a semi-portable device, e.g., a pen tablet computer mounted in the aircraft. A Class 3 EFB is a system installed in the aircraft and can be used as a typical avionics computer system to communicate with various avionics systems.

It would be desirable for a flight crew member to be able to remove a portable Class 1 EFB from an aircraft, develop information and store it in the Class 1 device while away from the aircraft, and subsequently transfer the information to a Class 3 EFB system on the aircraft. It also would be desirable for auxiliary flight crew members to be able to assist the flying crew by using a Class 1 device to perform at least some EFB functions in conjunction with the installed Class 3 system.

SUMMARY OF THE INVENTION

The present invention, in one implementation, is directed to an electronic flight bag apparatus. The apparatus includes an electronic flight bag (EFB) system installed in an aircraft and which interfaces with a ground network, and a portable EFB device connectible with the EFB system via a trusted link and secure connection.

In another implementation, the invention is directed to an apparatus for transferring information between a portable electronic flight bag (EFB) device and an EFB system installed in an aircraft. The EFB system includes a plurality of electronic flight bags (EFBs). The apparatus includes a processor of the EFBs configured to provide a trusted link and secure connection between the portable EFB device and the EFB system. A messaging client of at least one of the EFBs and a messaging client of the portable EFB device are configured to provide messaging via the secure connection between a module for an application of at least one of the EFBs and a module of the portable EFB device for the same application.

In yet another implementation, the invention is directed to a method of providing information to an electronic flight bag (EFB) system installed in an aircraft. The information is entered into a portable EFB device. The entering is performed while the portable device is not connected with the EFB system. The method also includes connecting the EFB portable device with the EFB system via a trusted link and secure connection, and transferring the information to the EFB system using the EFB portable device.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses. To any extent that FAA classification of electronic flight bags (EFBs) may be referenced herein, such description is included to enhance understanding and not to limit configurations of the invention.

Figure 1:
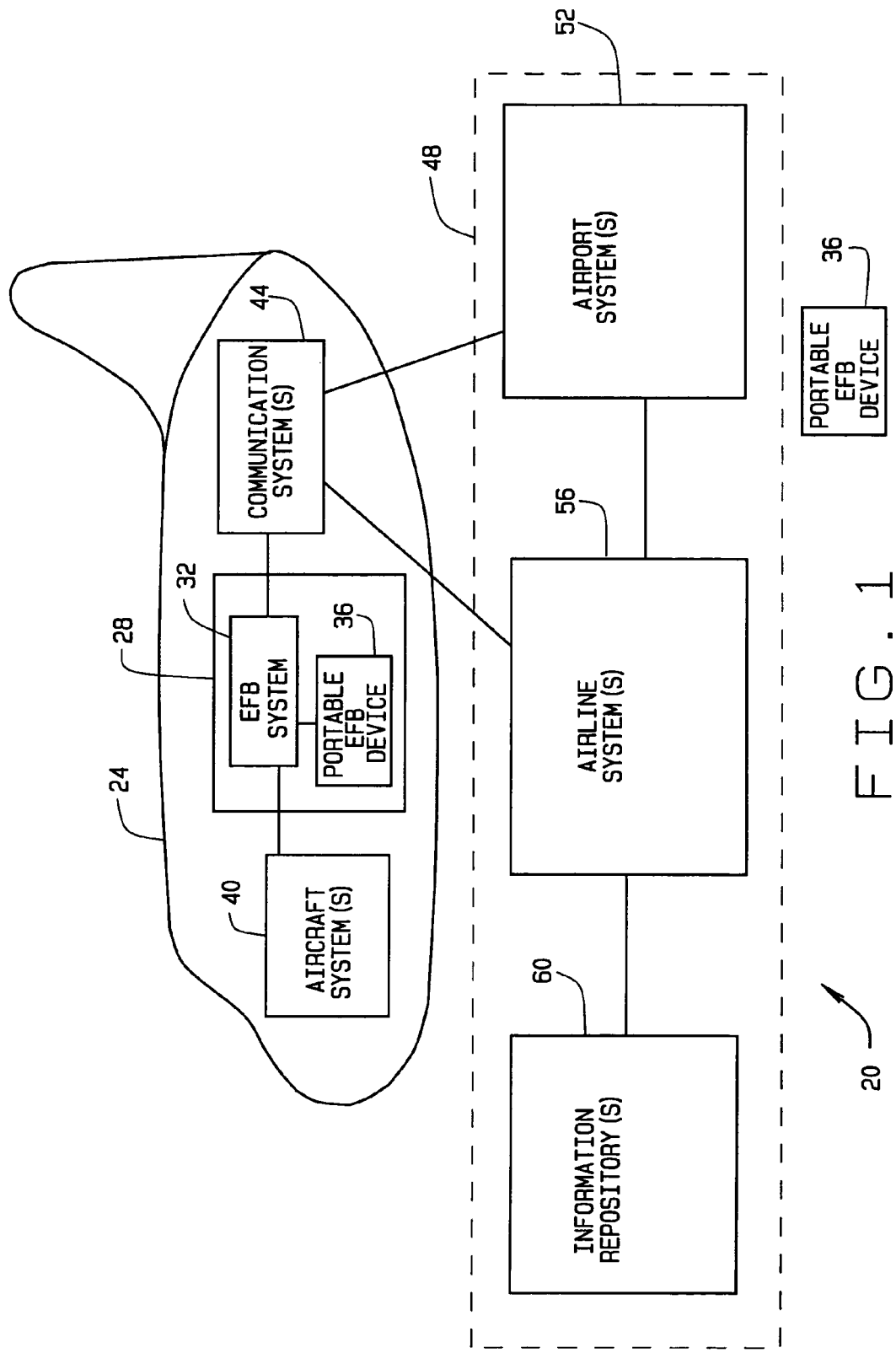
FIG. 1 is a block diagram of an aviation system in accordance with one configuration of the present invention.

An aviation system according to one configuration of the invention is indicated generally in FIG. 1 by reference number 20. The system 20 includes one or more aircraft, all or some of which may be operated by one or more airlines. One aircraft 24 is shown in FIG. 1. The aircraft 24 includes an electronic flight bag (EFB) apparatus 28. Included in the apparatus 28 are an EFB system 32 installed in the aircraft 24 and one or more portable EFB devices 36 connectible with the EFB system 32 as further described below. In the exemplary configuration shown in FIG. 1, the EFB apparatus 28 includes two portable devices 36, for example, one for each of two flight crew members on the aircraft 24. The portable devices 36 may be used by the two flight crew members during pre-flight and other low-workload phases and may also be used during flight by up to two auxiliary crew members. As shown in FIG. 1, one of the portable EFB devices 36 has been removed from the aircraft 24.

The EFB apparatus 28 receives information from one or more aircraft systems 40 for use in various applications. For example, information from onboard geo-referencing equipment (e.g., Global Positioning System) may be used with an electronic airport taxi map to indicate a current position of the aircraft 24 relative to the airport map. In the present configuration, the EFB apparatus 28 interfaces with aircraft system(s) 40 via the installed EFB system 32.

The EFB apparatus 28 uses one or more communications systems 44 of the aircraft 24 to interface with a ground network 48. Communication system(s) 44 may include, for example, GPRS (General Packet Radio Service), VHF, satellite networks, wireless IEEE 802.11 communication, and/or services such as ACARS$^{SM}$ (Airplane Communications and Recording System). ACARS$^{SM}$ is provided by ARINC, Inc. of Annapolis, Md. In the present configuration, the EFB apparatus 28 interfaces with the ground network 48 via the installed EFB system 32, which may communicate with the ground network 48 via Internet Protocol-based satellites.

The ground network 48 may include one or more airport communication systems 52 securely linked with one or more airline communication systems 56. The ground network 48 may also include one or more information repositories 60 for providing online aviation information, for example, to users of the airline system(s). Information repository(s) 60 may also be available to a flight crew of the aircraft 24 via the EFB apparatus 28. In the present configuration the flight crew may use the EFB apparatus 28 to access a repository 60 through an airline system 56. One known information repository is MyBoeingFleet.com, a secure Internet website providing information as to aircraft maintenance, performance, parts, etc. It should be noted that ground network components could differ in number and/or type in other configurations. For example, some configurations might not include information repository(s) 60. In some other configurations, a repository 60 may be mirrored in the airline system 56. In yet other configurations, a repository 60 may be included only in the airline system 56.

Figure 2:
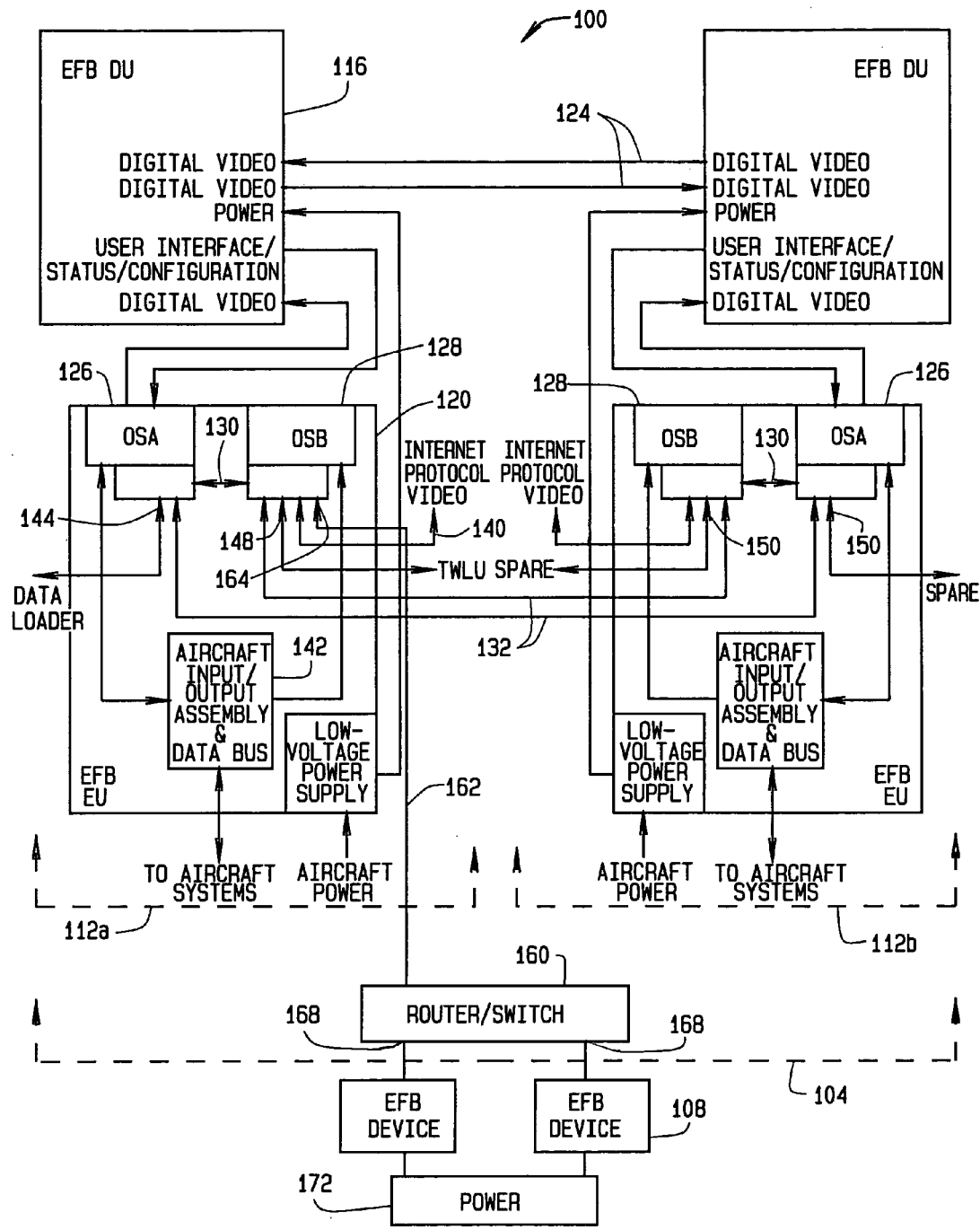
FIG. 2 is a block diagram of an electronic flight bag (EFB) apparatus in accordance with one configuration of the present invention.

One configuration of an EFB apparatus in accordance with principles of the invention is indicated generally in FIG. 2 by reference number 100. The apparatus 100 includes an EFB system 104 installed in an aircraft (not shown). The system 104 includes two installed EFBs 112a and 112b, for example, for use respectively by a captain and first officer of the aircraft. The system 104 also includes a pair of EFB portable devices 108 for use, for example, by auxiliary crew members to assist the captain and first officer.

Each EFB 112 may be configured to perform various functions and/or applications, including but not necessarily limited to various applications currently allowed by FAA rules to be performed by Class 3 EFB devices. Such applications may include but are not limited to the taxi positioning application mentioned above, an electronic logbook (ELB) application, a performance application, and/or an electronic documents (EDOCS) application. A terminal charts application allows a flight crew to search and assemble aviation charts needed to support takeoff and landing operations. A flight deck entry surveillance system application interfaces with a camera system allowing the flight crew to see anyone requesting entry to the flight deck. Additionally or alternatively, each EFB 112 is configured to perform one or more applications, which may include one or more of the foregoing applications, in cooperation with the portable EFB devices 108 as further described below.

Each EFB 112 includes a flight-deck-mounted display unit (DU) 116, an electronic unit (EU) 120 connected with the DU, and a keyboard (not shown). The EUs 120 may be installed in an equipment bay of the aircraft. The EUs 120 provide to the DUs 116 displays associated with various applications operating in the EUs 120. The EUs 120 allow the transfer of such displays between the DUs 116 via connections 124, for example, so that flight crew members can view each other's displays. The DUs 116 are placed for convenient access and viewing by the flight crew but typically are not conveniently accessible by auxiliary crew members during flight.

Each EU 120 includes two computers 126 and 128, each of which may have a dedicated disk drive and memory. For each EU 120, the computer 126 runs an operating system OS A and controls various applications which run on the computer 128. The computer 126 also may control displays associated with the applications. Thus, for example, the computer 126 may control displays associated with the taxi map positioning application described above. The computer 128 provides application programming interfaces (APIs) for various applications and includes an operating system OS B which may be different from the operating system of the computer 126. For example, a computer 126 may run a Linux® operating system and a computer 128 may run a Windows® operating system. Computers 126 and 128 of an EU 120 communicate with each other through an Ethernet connection 130.

The EUs 120 may communicate with each other, for example, through a plurality of Ethernet connections 132. More specifically, a computer 126 or 128 can communicate via a connection 132 with its offside peer computer 126 or 128. Each EU 120 also may host cabin-to-flight deck video feeds via links 140, thus providing for flight deck entry surveillance. A card 142 in each EU 120 reads aircraft system busses and serializes the data for input to the computers 126 and 128.

The computer 126 of the EFB 112a includes an Ethernet port 144 whereby, for example, an ARINC 615A data loader may be used to load data from the ground network 48 (shown in FIG. 1) into the EFB 112a. The computer 128 of the EFB 112a includes an Ethernet port 148 whereby applications running on the computer 128 may interface with the ground network 48 via communications system(s) of the aircraft, e.g., by means of a terminal wireless local area network unit (TWLU).

The EFB 112b includes spare ports 150. Thus all communications by EFBs 112a and 112b with the ground network 48 are directed through the EFB 112a. It should be noted, however, that in the present configuration the EFBs 112a and 112b are configured in essentially the same manner and can communicate with each other via Ethernet connections 132. Thus the EFBs 112 may include essentially the same software and hardware. Accordingly, for example, the spare ports 150 of the EFB 112b may be used instead of the ports 144 and 148 of the EFB 112a so that the EFB 112b may be used in place of the EFB 112a to perform functions associated with the ports 144 and 148. Other configurations are possible, however, wherein functions and/or capabilities of the EFBs 112 may differ in some respects.

Referring again to the EFBs 112a and 112b, each EFB includes security software whereby the EFB may be authenticated to the ground network for communication with the ground network 48. Thus an EFB 112 may be configured to communicate with the ground network 48 via a secure connection, for example, a virtual private network (VPN).

Figure 3:
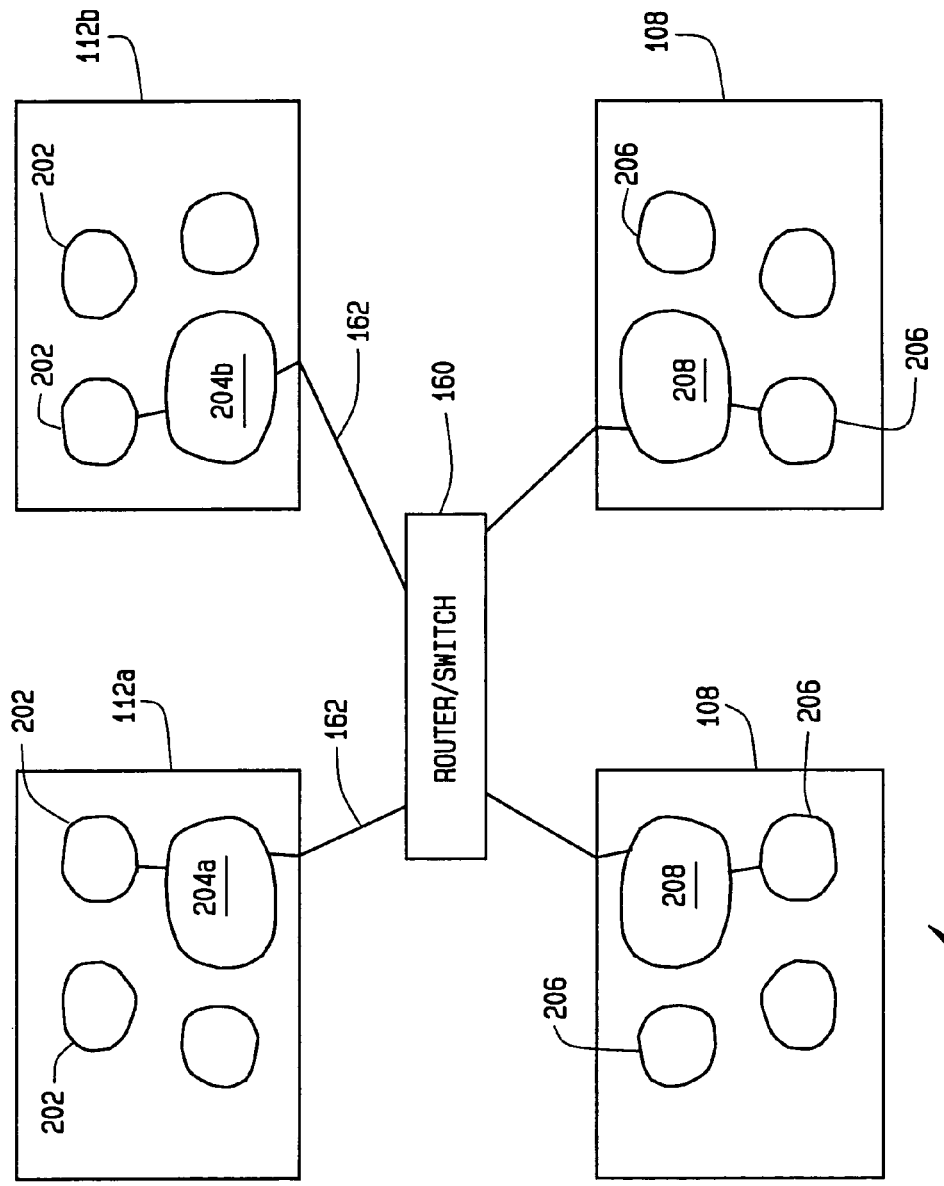
FIG. 3 is a conceptual diagram of selected elements of an electronic flight bag (EFB) apparatus and various exemplary software application modules in accordance with one implementation of the invention.

A router/switch 160 is connected with the EFBs 112 by one or more connections 162. For example, as shown in FIG. 2, the router/switch 160 is connected with the computer 128 of the EFB 112a, and thereby is connected with both EFBs 112, via a connection 162 at an Ethernet port 164. The connection 162 may be, for example, a 100 Base T copper connection. In some configurations, for example, as shown in FIG. 3 further described below, the router/switch 160 is directly connected with both EFBs 112 through two connections 162. The router/switch 160 may be, for example, an ARINC 763 compliant Ethernet Gateway Manager. This may be implemented as a simple switch or as part of a larger system such as a File Server Unit. In some configurations, Core Network, a network and server system by the Boeing Company, is used. The switch 160 allows an EFB 112 to be connected via Internet protocols to a single network domain such as a flight deck domain. A File Server Unit includes both a router and an Ethernet switch. The EFB 112 can thereby become part of a multi-domain network, e.g., a network including a flight deck domain and a cabin domain. Thus the EFB 112 may utilize devices outside the flight deck domain, for example, while protecting against intrusion from the cabin domain.

The portable EFB devices 108 can be reversibly connected with the EFB system 104 at ports 168 of the router/switch 160. The portable devices 108 are powered by a power source 172. Each portable device 108 includes a processor and memory and may be, for example, a laptop computer or a pen tablet computer, although other types of personal computing devices (PEDs) could be used in other configurations. Generally, a device 108 may be configured and/or classified in various ways. For example and not by way of limitation, in some configurations a device 108 may be mounted near observer seats of the aircraft and may be classified as a Class 2 device.

Although the router/switch 160 is connected with the EFB 112a, the router 160 alternatively could be connected with the EFB 112b. Further, although in the present embodiment the router/switch 160 is connected with the computer 128, in some embodiments the router/switch 160 is connected with the computer 126. In some other configurations the router/switch 160 may be omitted and the devices 108 can be connected directly with one or more of the computers 126 and 128. Additionally or alternatively, when connected and authenticated to the EFB system 104 as further described below, each portable EFB device 108 can communicate with each EFB 112 and may address either or both EFBs 112.

A portable device 108 may be configured with the same operating system OS B as the computers 128, which in the present exemplary configuration is a Windows® operating system. The portable device 108 also is configured to perform various functions and/or applications, including but not necessarily limited to applications currently allowed by FAA rules to be performed by Class 1 and/or Class 2 EFB devices. Additionally or alternatively, a portable device 108 is configured to execute a security software application, and the EFBs 112 are configured to execute a corresponding security application, for authenticating a portable device 108 for operation in connection with the EFB system 104.

When a user connects a portable EFB device 108 at a port 168 of the router/switch, the EFB 112a detects the connection and requests the connected portable device 108 for a digital certificate or key in accordance, e.g., with a preconfigured trust procedure and/or infrastructure. If, for example, the EFB 112a receives and authenticates a certificate from the connected portable device 108, the computer 128 of the EFB 112a establishes a trusted link with the device 108. A secure connection, for example, a virtual private network (VPN), then is established between the EFB and the device 108. If the certificate authentication fails, the computer 128 denies connection and blocks access by that device 108 through the router/switch 160. Additionally or alternatively, the portable device itself could block access through its router/switch 160 port.

When a trusted link and secure connection are established between the EFB 112a and the connected portable device 108, software clients may be enabled on the EFBs 112 and on the portable device(s) 108 which provide for application-to-application communication. A conceptual diagram of selected elements of the apparatus 100 and various exemplary software application modules is indicated generally in FIG. 3 by reference number 200. In the configuration 200, each device 108 is connected with each EFB 112 through the router/switch 160 and two connections 162. Each computer 128 of the EFBs 112 includes a plurality of application modules 202 and a messaging client 204. Each portable device 108 includes a plurality of application modules 206 and a messaging client 208. A messaging client 204 of an EFB 112 may communicate with the messaging client(s) 208 of each portable device 108 via the router/switch 160. It can be appreciated by those skilled in the art that a plurality of software arrangements could be used to provide the features described herein.

A software module 202 for a given application, when executing on an EFB 112, can send messages to and receive messages from a corresponding module 206 for the same application on the portable device 108. Similarly, when a module 206 for a given application is executing on the portable device 108, the module 206 can send messages to and receive messages from a corresponding module 202 for the same application executing on an EFB 112. Such applications may include but are not limited to terminal chart, electronic logbook (ELB), performance and/or electronic documents (EDOCS) applications.

In the present exemplary configuration, application-to-application communication is the only type of communication enabled between an EFB 112 and a portable device 108. Other configurations are contemplated, however, in which other or additional types of communication are permitted. In the present implementation, application-to-application communication is provided by a general-purpose software interface layer that facilitates the inclusion of various applications in the apparatus 100.

When, for example, an application is invoked on a portable device 108, the application typically communicates with its corresponding application on an EFB 112, so that both applications may validate their compatibility with each other. The applications also communicate to validate the compatibility of any data files to be used in the applications. Additionally or alternatively, validation of application compatibility and/or data file compatibility may be performed for some or all applications upon establishing a trusted link and secure connection between the device 108 and EFB 112 as previously described.

In the present configuration, the EFB system 104 does not accept data from a portable EFB device 108 unless an EFB 112 application requests such data. Other configurations are contemplated, however, in which a portable device 108 may "push" data to the EFB system 104 for one or more applications. In some configurations, the portable device 108 may "pull" data from the EFB system 104 for one or more applications.

In the present configuration, the portable devices 108 can be used to provide support for the EFB system 104. Thus, for example, a portable device 108 may include an electronic logbook application module 206 that can be used to create, modify and/or delete electronic logbook records. Logbook records may be referred to by the flight crew and/or sent by the EFB system 104 to the ground network 48, for example, to generate fault reports and/or maintenance requests.

In one exemplary implementation, during a flight an auxiliary crew may connect portable device(s) 108 with the EFB system 104 and enter logbook entries on behalf of the flying crew. An electronic logbook application module 202 running in one of the EFBs 112 may request the logbook updates from a logbook application module 206 on a portable device 108. The logbook entries may be sent from the device 108 to the EFB(s) 112. The flight crew may review the entries and enter digital signatures to approve the entries. The EFB(s) 112 may then send the entries to the airline system 56 for update to the repository 60. The EFB system 104 may also update the portable device logbook client 206 with any logbook record updates introduced by users into the EFB system 104 logbook application module 202. In one implementation, a logbook database maintained in the EFB system 104 is the authoritative logbook data repository for the EFB apparatus 100. It should be noted generally that applications are contemplated in which an application module 206 may send a message via an EFB application module 202 to the ground network 48 with or without flight crew interaction.

Other applications that may be run on both the EFB system 104 and a portable EFB device 108 include an electronic documents (EDOCS) application, by which a crew member may search various documents, e.g., flight crew operating manuals, information manuals, etc. In one implementation, a user of a portable device 108 may execute an EDOCS module 206 to send a "bookmark" to an EDOCS module 202 of an EFB 112 noting results of a search for use by another crew member.

In some implementations, a portable device 108 may include a terminal charts application module 206. A flight crew member could, for example, use the device 108 to review charts in his/her hotel room, select needed charts, and put them into a "chart clip". The chart clip could be sent to the EFB system 104 after the device 108 is connected with the EFB system 104 prior to flight departure. Additionally or alternatively, an auxiliary crew member could create chart clips during flight and provide them to the EFB system 104.

It can be appreciated that a wide variety of applications may be implemented on a portable EFB device and on an EFB system in accordance with principles of the present invention. Coordinating various applications of an installed EFB system with those of a portable EFB device makes it possible, for example, for an aircraft crew member to remove the portable device, take it home or to a hotel room, enter flight information into the device in a convenient manner, and transfer the information to the installed EFB system. The foregoing apparatus and methods also make it possible in a multi-crew flight for a non-flying crew member to participate in the administration of the aircraft, for example, by filling out logbook entries.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An electronic flight bag apparatus comprising:
   an electronic flight bag (EFB) system installed in an aircraft and configured to interface with a ground network via one or more communication systems of the aircraft, the EFB system including at least one installed EFB having an electronic unit and a display unit connected with the electronic unit, the electronic unit further including one or more computers configured to execute a first software client of a flight-related application, wherein the flight-related application also includes a second software client corresponding to the first software client, and to provide to the display unit with information to generate one or more displays associated with the flight-related application;
   a portable EFB device configured to perform at least part of the flight-related application that makes use of the second software client when not connected with the EFB system and, when on the aircraft, connectible with the EFB system via a trusted link and secure connection to perform the flight-related application in coordination with the at least one installed EFB; and
   the first and second software clients of the flight-related application further being able to communicate with one another and perform application-to-application communications using both of the installed EFB and the portable EFB device, and further such that either of said first and second software clients is able to generate messages for downloading to the ground network and each is able to assist a crew member with flight related operations.

2. The apparatus of claim 1, wherein the display unit is mounted in a flight deck of the aircraft, and the electronic unit is installed in an equipment bay of the aircraft.

3. The apparatus of claim 1, wherein the portable EFB device comprises one of the following: a laptop computer, and a pen tablet computer.

4. The apparatus of claim 1, wherein the at least one installed EFB comprises a plurality of installed EFBs configured to communicate with one another.

5. The apparatus of claim 1, wherein the application-to-application communication is performed via a software interface layer.

6. The apparatus of claim 5, wherein the first and second software clients communicate via a messaging client installed in the portable EFB device in communication with a messaging client installed in one of the at least one installed EFB.

7. The apparatus of claim 5, wherein the application-to-application communication is the only type of communication enabled between the at least one installed EFB and the portable EFB device.

8. The apparatus of claim 1, the portable EFB device configured to support the EFB system in providing one or more of the following: an electronic logbook, a terminal chart, and an electronic document.

9. The apparatus of claim 5, wherein the software client of the portable EFB device sends a message to the ground network via the EFB system.

10. An apparatus for transferring information between a portable electronic flight bag (EFB) device and an EFB system installed in an aircraft, the portable EFB device configured to perform at least part of a flight-related application when not connected with the EFB system, the apparatus comprising:
    at least one installed EFB having an electronic unit installed as equipment of the aircraft, the electronic unit having a first software client and one or more computers configured to provide a trusted link and secure connection between the portable EFB device and the EFB system when the portable EFB device is on board the aircraft;
    the portable EFB having a second software client that corresponds to the first software client;
    a messaging client of at the least one installed EFB; and
    a messaging client of the portable EFB device;
    the messaging clients configured to provide messaging via the secure connection between the first software client for the flight-related application of the portable EFB device and the second software client of the at least one installed EFB for the same flight-related application, such that application-to-application communications is enabled between the portable EFB device and the installed EFB;
    the information transferred when at least part of the flight-related application is performed by the portable EFB device in coordination with performance of at least part of the same flight-related application by the at least one installed EFB.

11. The apparatus of claim 10, further comprising a router/switch, the portable EFB device connectible with the electronic unit of the at least one installed EFB via the router/switch.

12. The apparatus of claim 10, wherein the messaging clients are further configured to provide messaging only among modules for the same application, and application-toapplication communication is the only type of communication enabled between the at least one installed EFB and the portable EFB device.

13. The apparatus of claim 10, the portable EFB device configured to support the at least one installed EFB in providing one or more of the following: an electronic documents (EDOCS) application, a terminal charts application, and an electronic logbook application.

14. The apparatus of claim 10, the messaging clients of a logbook application of the portable EFB device and the at least one installed EFB configured to provide a transfer of updated logbook records from the portable EFB device to the EFB system.

15. A method of providing information to an electronic flight bag (EFB) system installed in an aircraft, the method comprising:
  entering information into a portable EFB device having a first software client associated with a flight-related application, the flight-related application being at least partly performed by a processor of the portable EFB device when the portable device is not connected with the EFB system installed in the aircraft; and
  when the EFB portable device is on the aircraft, connecting the EFB portable device with at least one installed EFB of the EFB system, the installed EFB having a second software client corresponding to the first software client, and the connecting being accomplished via a trusted link and secure connection;
  transferring the information to the EFB system using the EFB portable device in communication with the at least one installed EFB;
  the information transferred when the EFB system and the processor of the EFB portable device cooperatively perform application-to-application communication via the corresponding first and second software clients of the flight-related application, and such that each of the installed EFB and the EFB portable device is able to assist a crew member with flight related operations; and
  the application-to-application communication being the only type of communication enabled between the at least one installed EFB and the portable EFB device.

16. The method of claim 15, wherein the EFB system is in communication with a ground network, the method further comprising transferring the information to the ground network using the EFB system.

17. The method of claim 15, wherein entering the information into the portable device comprises using a module of the device for the flight-related application, the application module configured to communicate with a module of the at least one installed EFB for the same application.

18. The method of claim 17, wherein transferring the information comprises using a messaging client of the EFB portable device to communicate with a messaging client of the at least one installed EFB to provide the communication between the application modules.

19. The method of claim 15, wherein the at least one installed EFB includes an electronic unit and a display unit connected with the electronic unit and mounted in a flight deck of the aircraft, the electronic unit further including one or more computers configured to perform the flight-related application and to provide to the display unit one or more displays associated with the application, the method further including observing on the display unit the information transferred to the EFB system from the portable EFB device.

* * * * *